UNITED STATES PATENT OFFICE.

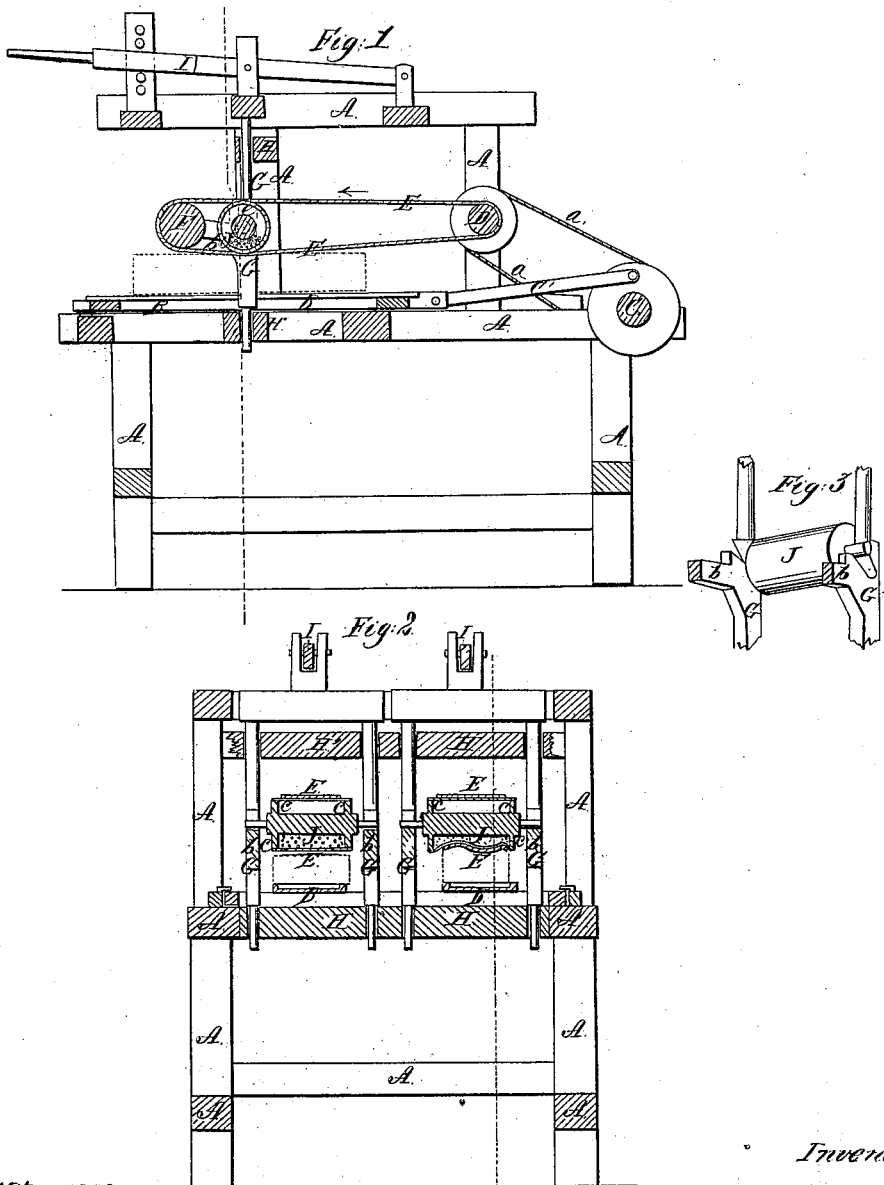

JOEL B. MORRIS, OF ANSONIA, CONNECTICUT.

MACHINE FOR POLISHING CABINET-WORK.

Specification of Letters Patent No. 29,293, dated July 24, 1860.

*To all whom it may concern:*

Be it known that I, JOEL B. MORRIS, of Ansonia, in the county of New Haven and State of Connecticut, have invented a new and useful Machine for Smoothing Varnished Stuff; and I do hereby declare that the following is a full, clear, and exact description thereof, reference being had to the accompanying drawings, making a part of this specification, in which—

Figure 1, is a vertical longitudinal section taken through the machine in a plane indicated by the red line $x$, $x$, marked on Fig. 2; Fig. 2, a transverse vertical section taken through the machine as indicated by the red line $y$, $y$, Fig. 1; Fig. 2, a perspective view of the pressure roller and its guides.

Similar letters of reference indicate corresponding parts in the three figures.

This invention has for its object the smoothing of all varieties of varnished stuff, having either a plane, waved, or beveled surface.

The invention consists in combining with a suitable carriage that is capable of receiving a rectilinear reciprocating motion, a movable frame carrying a roller, over which passes an endless band; and a yielding pressure roller that is hung in the movable frame and constructed in such a way that it will act upon the endless band, that has an emery (or any other suitable powder) surface, and keep the band in contact with the stuff that is passed under it, however ununiform may be the varnished surface, the whole to be arranged and constructed as will be hereinafter described and represented.

To enable those skilled in the art to fully understand my invention I will proceed to describe its construction and operation.

In the drawings A, represents a strong frame of a suitable height for supporting the several movable parts. On top of this frame, which in the present case carries two smoothing devices, is placed horizontal guide ways that extend longitudinally with the machine; and between these ways the carriage B, is placed, on which the work to be submitted to the smoothing operation is placed and suitably secured. This carriage receives an alternate reciprocating motion from the driving shaft C, through the medium of connecting rod C'. The shaft C, gives a rotary motion to the long roller D, that passes transversely across the upper part of frame A, by the belt $a$, over which roller passes the emery belts E, E, each of which are carried back horizontally, or parallel with the carriage B, and passed over rollers F, each of which have their bearings in arms $b$, $b$, that project out from the movable frames G, G, the belts now move in the direction indicated by the arrows in Fig. 1.

The frames G, G, consist of two perpendicular bars placed parallel to each other that are moved up or down in cross timbers H, H', of frame A, by levers I, I, operated by the hand so as to keep the machine under perfect control. In advance of the short rollers F, over which the bands E, E, pass, is placed the pressure or pressing rollers J, J, the shafts of which play in oblique slats in the uprights G, G, of the movable frames. These pressure rollers consist of cylindrical bags of shot, sand, or other suitable pliant substance of a like nature, but in practice, common shot will be used, and the surface forming the cylindrical bag, will be made of rubber, or common cloth tacked around two cylinder heads $c$, $c$, as clearly represented in Fig. 2; the cloth is tacked loosely to the heads, so that it will allow the body of shot to adapt themselves to the conformation of the stuff to be smoothed. These pressure rollers are placed parallel with, and at intermediate points between the two band rollers, and they act upon the bands E, E, and cause the bands to act upon the varnished surface of the stuff that is placed on the carriage B, and moved back and forth by the same, as represented in the drawings.

I do not claim a reciprocating carriage irrespective of its arrangement and combination with the frame carrying the pressure roller; nor do I wish to claim broadly the combination of the carriage and frame, except when this frame is furnished with a lever so that the pressure on the roller may be controlled by the hand, while the carriage moves the work back and forth under this roller.

Having thus described my invention what I claim as new, and desire to secure by Letters Patent is:

The combination of traveling carriage B, movable roller frame G, G, and levers I, I, when the same are arranged in the manner and for the purposes set forth.

JOEL B. MORRIS.

Witnesses:
WM. B. BRISTOL,
LEWIS F. BENEDICT.